United States Patent [19]
Williams et al.

[11] Patent Number: 6,104,572
[45] Date of Patent: Aug. 15, 2000

[54] SUSPENSION HAVING REDUCED TORSIONAL MODE GAIN AND SENSITIVITY

[75] Inventors: Stephen P. Williams, Morgan Hill; Timothy A. Riener, Fremont, both of Calif.

[73] Assignee: Quantum Corporation, Milpitas, Calif.

[21] Appl. No.: 08/937,566

[22] Filed: Sep. 25, 1997

Related U.S. Application Data

[63] Continuation-in-part of application No. 08/794,674, Feb. 3, 1997, abandoned, which is a continuation of application No. 08/516,901, Aug. 18, 1995, abandoned.

[51] Int. Cl.⁷ .................................................. G11B 5/49
[52] U.S. Cl. ................................................. 360/104
[58] Field of Search ........................................ 360/104

[56] References Cited

U.S. PATENT DOCUMENTS

| | | | |
|---|---|---|---|
| 5,027,241 | 6/1991 | Hatch et al. | 360/105 |
| 5,065,268 | 11/1991 | Hagen | 360/104 |
| 5,471,734 | 12/1995 | Hatch et al. | 29/603 |
| 5,543,985 | 8/1996 | Donnelly et al. | 360/104 |
| 5,657,187 | 8/1997 | Hatch et al. | 360/104 |
| 5,835,307 | 11/1998 | Sone | 360/104 |

OTHER PUBLICATIONS

Ohwe et al. Development of Integrated Suspension System for a Nanoslider with an MR Head Transducer, *IEEE Trans. on Magnetics*, vol. 29, No. 6, Nov. 1993, pp3924–26.

*Suspension Product Matrix*, Hutchinson Technology Inc., Hutchinson, MN 55350–9784, Six page brochure, © Sep. 1994.

*Primary Examiner*—Robert S. Tupper

[57] ABSTRACT

An improved suspension for supporting a read/write head adjacent to a relatively moving storage medium in a disk drive is disclosed. The suspension includes a curved loadbeam or a curved flexure that reduces the magnitude of the gain in the first torsion resonant mode of oscillation when the Z-height of the loadbeam is configured for minimum sensitivity of the first torsion gain as a function the loadbeam Z-height, thereby providing a suspension capable of providing improved head position servo performance and improved manufacturing and assembly yields.

4 Claims, 6 Drawing Sheets

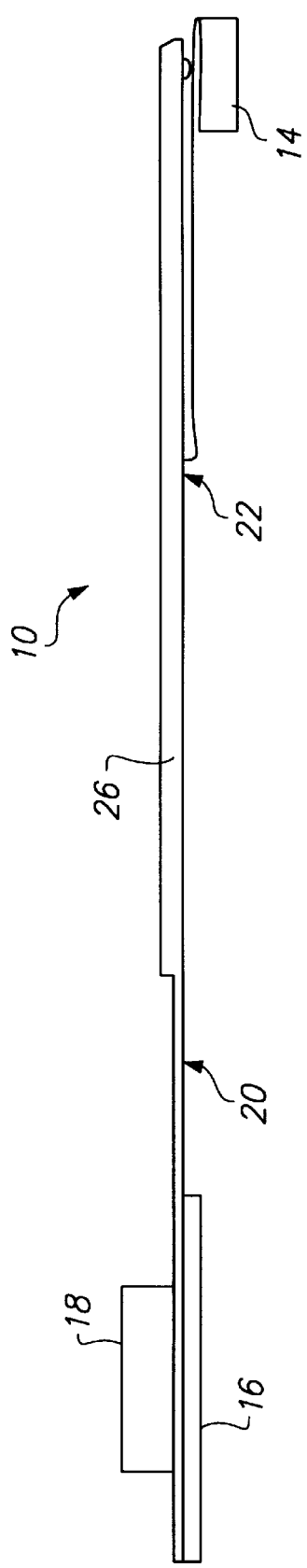
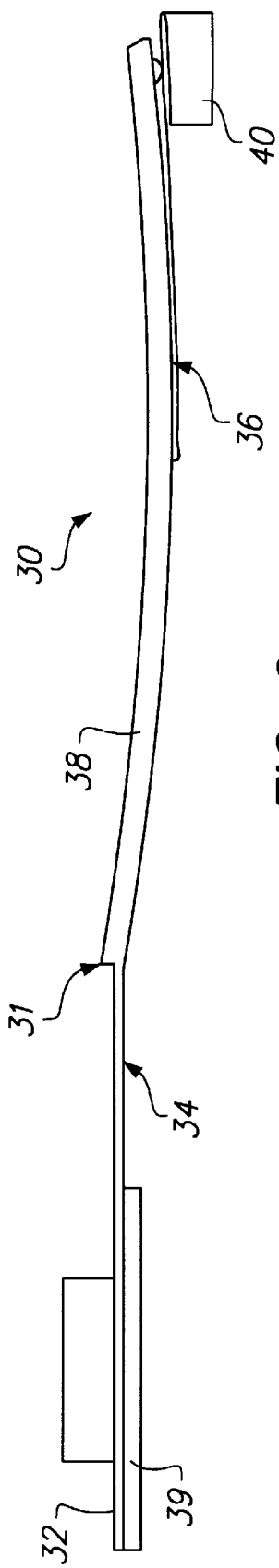
FIG. 2 (PRIOR ART)
FIG. 3

SECTION A-A

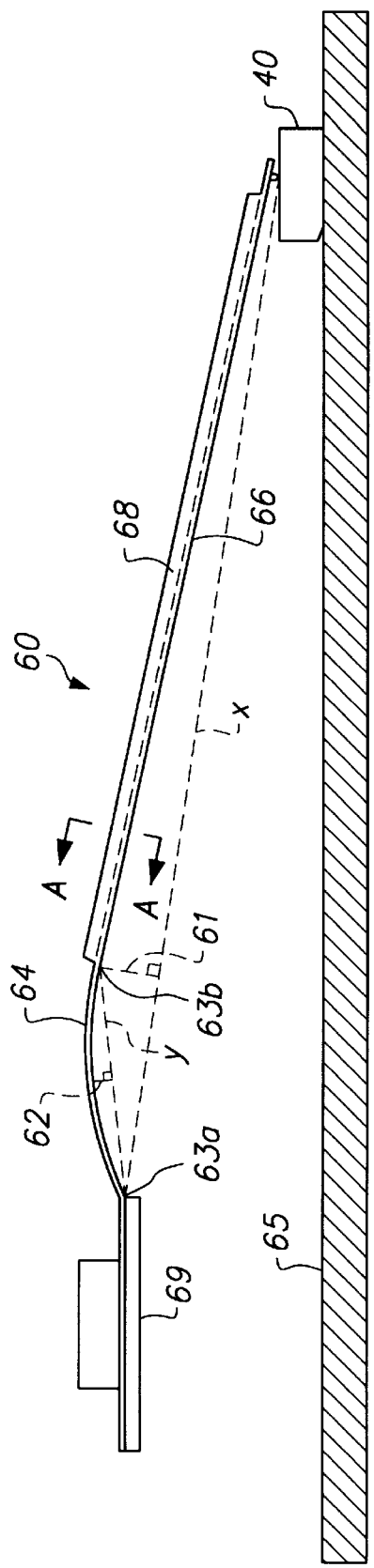
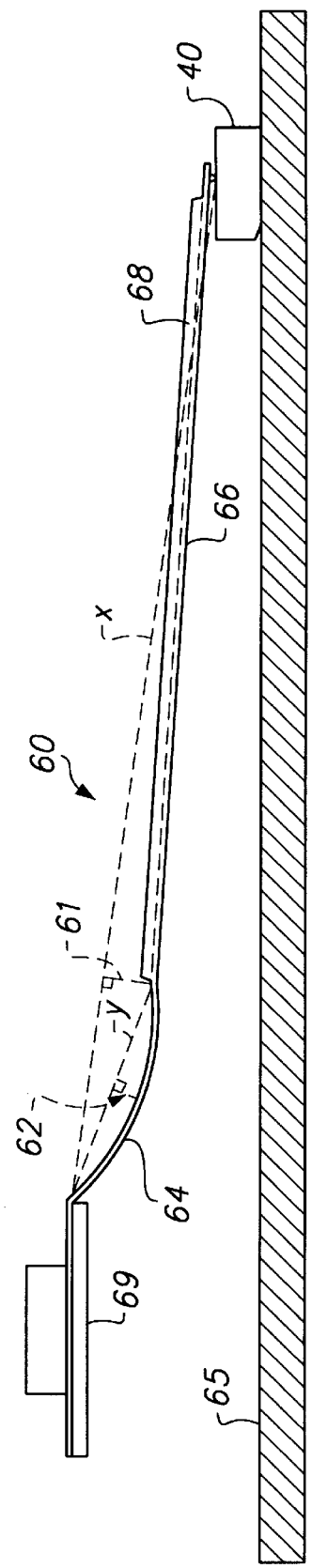
FIG. 6A
FIG. 6B

SUSPENSION HAVING REDUCED TORSIONAL MODE GAIN AND SENSITIVITY

REFERENCE TO RELATED APPLICATION

This application is a continuation-in-part of application Ser. No. 08/794,674, filed Feb. 3, 1997, now abandoned which is a continuation of application Ser. No. 08/516,901 filed Aug. 18, 1995, now abandoned.

FIELD OF THE INVENTION

This invention relates generally to a suspension for supporting a read/write head adjacent to a relatively moving recording medium in a disk drive. More particularly, the invention relates to a suspension including a structural member configured with a controlled curvature to reduce both the gain of torsional mode oscillations and the sensitivity of the torsional mode gain to certain suspension manufacturing variations.

BACKGROUND

The disk drive industry is extremely competitive and therefore, disk drive demand tends to be characterized by a high sensitivity to price per unit storage capacity. To achieve high data storage capacities within a particular disk drive package, multiple disk platters are typically mounted concentrically to a spindle motor and operated in conjunction with a set of ganged heads, each of which is supported on a gimbal structure which forms a part of a suspension member (hereinafter, "suspension").

The suspensions, in turn, are mounted to rigid actuator arms which are connected to a common, rotatable structure typically known as an E-block. The E-block is attached to a voice coil motor structure to form a mass-balanced, closed-loop servo positioning, rotary actuator structure capable of selectively positioning the ganged heads at various radial locations or tracks relative to the disks. Since the suspensions form a part of the mechanical structure within the servo loop, the dynamic characteristics of the suspensions can limit the achievable servo system performance.

Copending U.S. application Ser. No. 08/249,525 entitled METHOD FOR CHARACTERIZING AND CONTROLLING IN-PLANE STIFFNESS OF LOAD BEAM WITHIN HEAD-GIMBAL ASSEMBLY OF A HARD DISK DRIVE, now U.S. Pat. No. 5,471,734, the disclosure of which is hereby incorporated by reference, teaches that the spring and loadbeam of a suspension can be geometrically configured such that the first torsional resonance mode has a minimum or optimum sensitivity of gain with respect to handling and manufacturing tolerances. Specifically, the sensitivity of the first torsion gain can be reduced by controlling the Z-axis height of the end of load beam region adjacent to the spring. By thus reducing the sensitivity of the gain to manufacturing processes, the manufacturing yields of load beam fabrication and headstack assembly operations, for example, can be dramatically improved. This reduced gain sensitivity does not imply that the magnitude of the gain itself is reduced, however, thus such suspensions may not show improved absolute performance, notwithstanding the improvement in the consistency of the performance.

Thus a hitherto unresolved need exists for a suspension which exhibits reduced first torsional gain sensitivity to manufacturing processes while concurrently providing a reduced nominal magnitude of gain to facilitate improved servo system performance.

SUMMARY OF THE INVENTION

A general object of the present invention is to provide a suspension for supporting a read/write head in a disk drive which overcomes limitations and drawbacks of the prior art.

A more specific object of the present invention is to provide a suspension for a disk drive that exhibits reduced nominal gain in the first torsional mode of oscillation by shifting a mass centerline of a reinforced beam section of the suspension either towards or away from the disk.

Yet another object of the present invention is to provide a suspension that achieves lower nominal gain at the point of minimum gain sensitivity.

An additional object of the invention is to provide a suspension including a load beam or flexure having an imparted or optimized curvature to reduce the nominal gain at the point of minimum gain sensitivity.

An additional object of the present invention is to provide a method for manufacturing a suspension having a loadbeam and flexure combination which provide lower nominal first torsional gain at the point of minimum gain sensitivity.

These and other objects of the invention are realized in a fixed disk drive head and disk assembly including a data storage disk rotating at a predetermined angular velocity relative to a baseplate structure (i.e., a base), and an in-line rotary actuator structure rotatably mounted to the base and including an in-line head mounting structure or suspension for supporting and moving a read/write head at different radial locations relative to the disk, thereby defining a plurality of distinct data tracks in which information is ultimately recorded. In accordance with the present invention, the disk drive includes an improved suspension structure which includes a gimbaled flexure attached to the distal end of a cantilevered, elongated loadbeam having rail type stiffeners. The loadbeam is connected to a leaf spring section which is supported by a mounting region located at the cantilevered end of the suspension. The leaf spring section may be pre-bent so that when the heads are mounted in the drive, the suspension is deflected to a generally straight condition to allow for even closer disk to disk spacing. The loadbeam has a curvature, either directly formed during manufacture or imparted via the flexure mounting scheme, which reduces the nominal first torsion gain of the suspension at the point of lowest gain sensitivity.

These and other objects, advantages, aspects, and features of the present invention will be more fully appreciated and understood upon consideration of the following detailed descriptions of a preferred embodiment presented in conjunction with the accompanying drawings.

BRIEF DESCRIPTION OF THE DRAWINGS

In the Drawings:

FIG. 2 is a diagrammatic side elevation of a prior art Type 8 HGA.

FIG. 3 is a diagrammatic side elevation of an HGA having an imparted negative sag in the loadbeam in accordance with the principles of the present invention.

FIG. 6a is a side elevation view of a loadbeam with a positive offset and positive bump formed into the spring section.

FIG. 6b is a side elevation view of a loadbeam with a negative offset and negative bump formed into the spring section.

DETAILED DESCRIPTION

Figure 1:
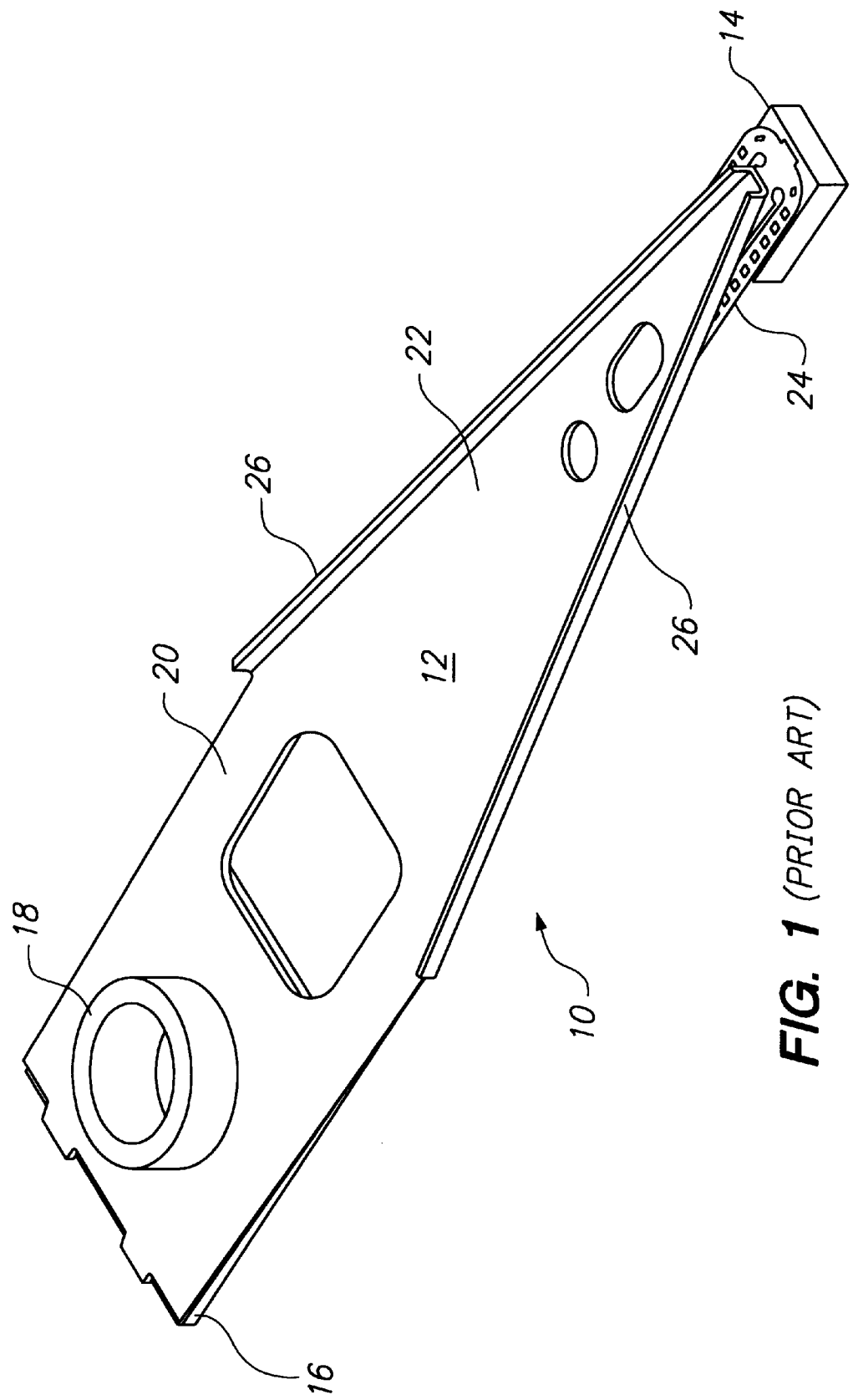
FIG. 1 is a diagrammatic trimetric view of a prior art Type 8 head gimbal assembly (HGA).

FIG. 1 shows a conventional prior art head-gimbal-assembly (HGA) 10 which includes a "Type 8" suspension 12 and a supported read/write head 14. Suspension 12 consists of a rigid planar baseplate 16, which may include an integral swaging boss 18 for mounting the suspension to an actuator arm (not shown), a spring section 20, a loadbeam 22, and gimbaled flexure 24 which is attached to the distal, unsupported end of the suspension for pivotably supporting read/write head 14. Loadbeam 22 typically includes a pair of rails 26 along the lateral edges to stiffen the loadbeam structure. The configuration of rails 26 influences the resonant frequencies of HGA 10, hence rails 26 are typically designed to improve servo system performance by moving the resonant frequencies of HGA 10 higher (to improve servo bandwidth) and away from the servo sampling frequency or its aliased variants.

Figure 5:
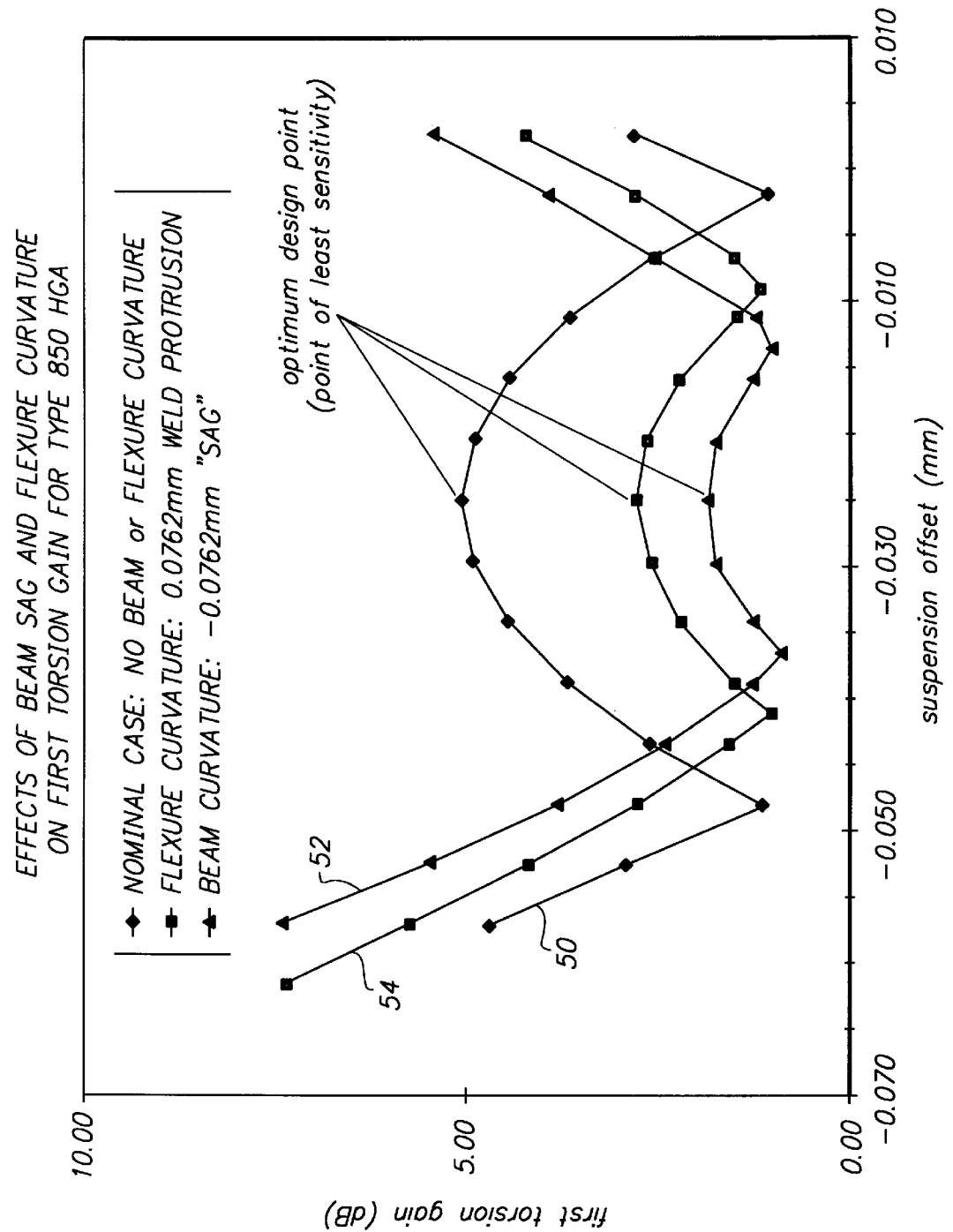
FIG. 5 is a graph showing the results of finite element modeling wherein the maximum peak first torsion resonance gain (normalized at 1 kHz) is plotted as a function of suspension offset for various loadbeam and flexure configurations.

FIG. 2 shows a side view of the HGA shown in FIG. 1. Flexure 24 of FIG. 1 has been omitted for clarity. Loadbeam 22 is conventionally manufactured and operated in a nominally flat state, however, as the rails 26 are formed, there is an induced stress that causes the resultant loadbeam to bow somewhat. Spot welding operations may also affect loadbeam flatness due to localized annealing or recrystallization. For an uprail loadbeam design such as that shown in FIGS. 1 and 2, the fabrication induced beam bow typically causes the center of the loadbeam to be elevated, relative to the ends, on the order of 1 mil. FIG. 5, curve 50, shows a graph of the dynamic behavior of the nominally flat load beam of FIG. 2 operating in conjunction with a conventionally mounted flexure. The curve 50 shows the maximum peak first torsion resonance gain (with respect to 0 dB at 1 kHz) as a function of the imparted suspension offset. Thus the HGA 10 of FIG. 2 should be manufactured such that its loadbeam base is offset by −0.025 mm along the Z-axis in order to minimize the sensitivity of the first torsion gain (because the rate of change of the gain with respect to the offset is approximately zero at −0.025 mm offset). Although this operating point is not the point of lowest gain it nonetheless results in the least sensitivity of the gain and since manufacturing and assembly operations tend to re-adjust suspension offset, the selected operating point is likely to provide significantly better manufacturing yields than, for example, the offsets where a local minimum gain is achieved, because very slight variations in offset at the local minima tend to lead to dramatic and undesirable increases in first torsion gain. The selected operating point not only minimizes the variation in gain but also effectively defines an upper bound for the gain so that slight deviations from the optimum point may actually result in somewhat better mechanical performance.

FIG. 3 shows a side elevation of an HGA 30 in accordance with a preferred embodiment of the present invention. In this embodiment of the present invention, the suspension 31 has an overall length in the longitudinal direction of about 20–30 millimeters and a transverse width on the order of about 5 millimeters at the widest region of the suspension which is typically at or near the mounting end of the suspension. The main suspension body member is chemically etched from flat stainless steel sheet having a thickness on the order of about 60–75 microns. The etching operation defines the regions that will ultimately comprise the mounting area 32, spring 34, load beam 36, and rails 38.

After the suspension body member is etched, mechanical forming operations are employed to impart features generally perpendicular to the major surfaces of loadbeam 36, in this case, a laterally spaced apart pair of upswept rails 38 and the spring section 34. The spring section 34 (represented by 64 in FIG. 6a) is plastically deformed into a curved shape, as shown in FIG. 6a, to apply a preload force urging the gimbal and slider 40 toward the disk surface. The curve shape is defined by a line 62, the magnitude of which denotes a "bump" parameter. Line 62 is perpendicular to line y, which is actually the hypotenuse of the right triangle having its base congruent with the x-axis and height dimension 61. Line y extends from a spring reinforcement junction 63b to a spring-swage plate junction 63a. Since line 62 extends away from the disk surface 65, the bump is said to have a "positive bump". In addition, the suspension 60 is formed with an "offset" as shown in FIG. 6a. The magnitude of the offset is established by the height dimension 61, since this dimension marks a distance from the load beam 60 at a junction of the spring section 64 and the reinforced region 68. In the embodiment of FIG. 6a, dimension 61 illustrates a "positive offset" since the load beam 60 is formed away from the base axis x and the adjacent disk surface 65. Alternatively, the spring section 64 may also be deformed with a negative bump 62 and negative offset 61, as shown in FIG. 6b. A load beam having the aforementioned negative bump and negative offset has been found to dramatically improve suspension performance, as described in commonly assigned U.S. Pat. No. 5,471,734 and U.S. Pat. No. 5,657,187, the disclosures thereof being incorporated herein by references. Also, during the mechanical forming operation, the loadbeam 36 is imparted with a slight negative curvature (i.e., negative "sag" with a radius of curvature of about 236 mm) such that the central portion of the load beam is ultimately positioned about 3 mils closer to the disk than would be the case with a flat loadbeam. It should be noted that direction of the imparted curvature or sag (in accordance with the present invention) is opposite that which would normally occur during conventional uprail loadbeam fabrication. Additionally, the magnitude of the imparted sag is about three times that which tends to occur during normal loadbeam fabrications. The resulting advantage of the curvature in the load beam 36 is that a mass ceneterline of the suspension 31 is moved closer towards the disk. Comsequently, as discussed below, the first torsional gain of the suspension is decreased.

A separately fabricated load plate 39 is typically turned or formed in a progressive die operation and is attached to suspension 31 via conventional means, e.g., spot welding. Similarly, a flexure (not shown) is conventionally spot welded or otherwise affixed to the underside of the loadbeam 36 to complete suspension 31. Read/write head 40 is attached to the flexure to finish the fabrication of an HGA 30 in accordance with a preferred embodiment of the invention.

FIG. 5, curve 52, shows the first torsion gain of suspension 31 shown in FIG. 3 as a function of the imparted suspension offset. The optimal operating point of the sagged loadbeam embodiment of the present is about 3 dB lower in first torsion gain than a conventional Type 8 suspension.

Figure 4:
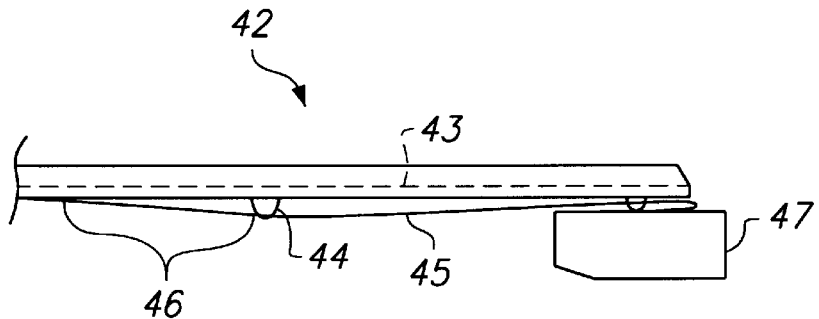
FIG. 4 is a side elevation of the distal end of an HGA in accordance with an alternative embodiment of the present invention.

FIG. 4 discloses an alternative preferred embodiment of an HGA 42 in accordance with the present invention. In this embodiment the loadbeam 43 is manufactured conventionally in a generally flat configuration, except that a protrusive feature 44 of about 0.08 mm height is manufactured onto either loadbeam 43 (or alternatively, on flexure 45) and is positioned between loadbeam 43 and flexure 45 intermediate the longitudinal ends of flexure 45. Flexure 45 is spot welded or otherwise affixed to the underside of loadbeam 43 at bonding points 46 at the proximal end of the flexure and at the location of the protrusive feature 44, which results in a separation of the central portion of the flexure structure from the underside of loadbeam 43. Head 47 is mounted to flexure 45 to complete the HGA 42. Although this curved flexure embodiment results in somewhat higher nominal gain than the curved loadbeam embodiment, this embodiment may be easier to implement while still providing about a 2 dB first torsion gain reduction relative to a conventional Type 8 suspension, as shown in curve 54 of FIG. 5. Again, the effect of introducing protrusive feature 45 and the resulting separation of the central portion of flexure 45 towards the disk, is that the mass centerline of the suspension is moved towards the disk, thereby reducing the first torsional gain.

Figure 7:
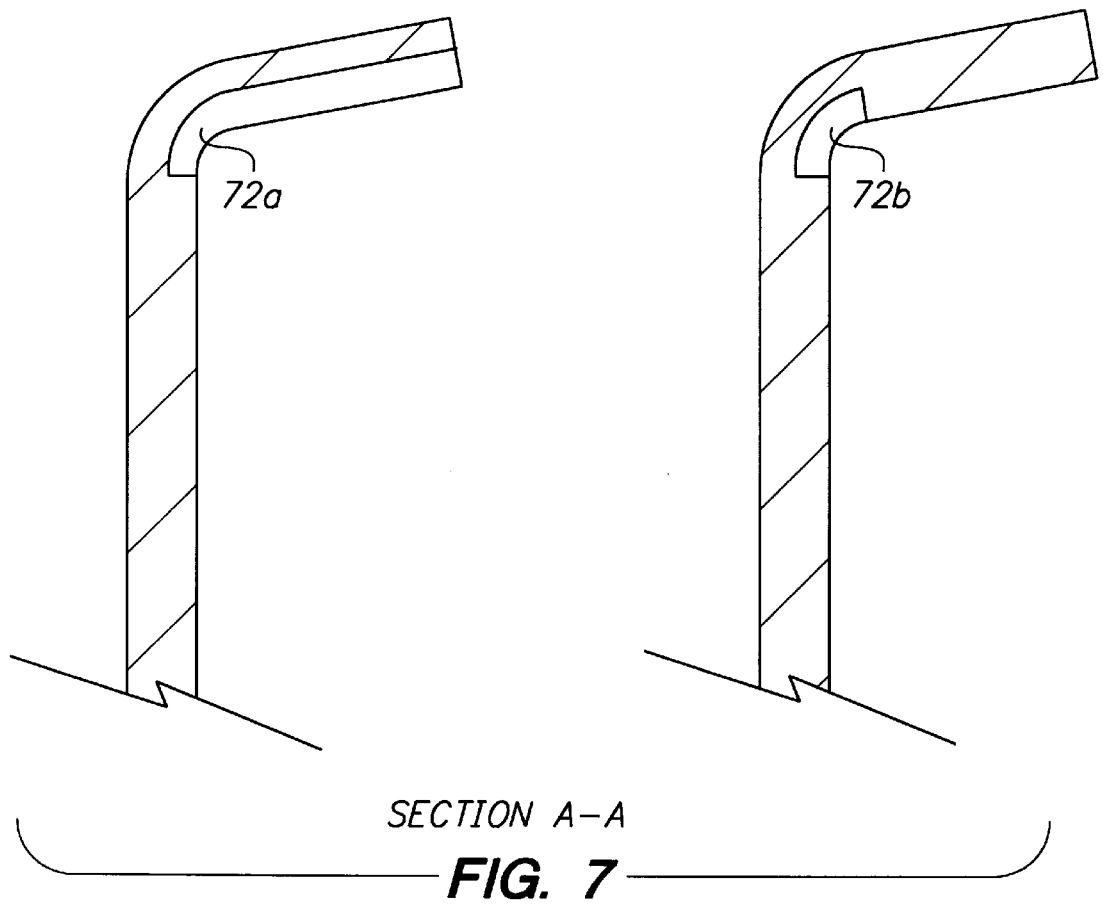
FIG. 7 is a cross sectional view of an alternative embodiment for imparting negative sag curvature to a load beam, showing a partially etched section of the side rail of FIG. 6a, in accordance with principles of the present invention.
Figure 8:
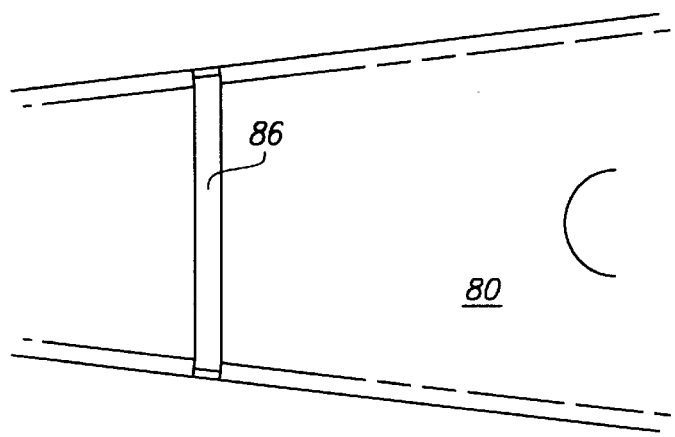
FIG. 8 is a plan view of an alternative embodiment for imparting negative sag curvature to a load beam, showing a transversely defined partially etched section, in accordance with principles of the present invention.
Figure 9A:
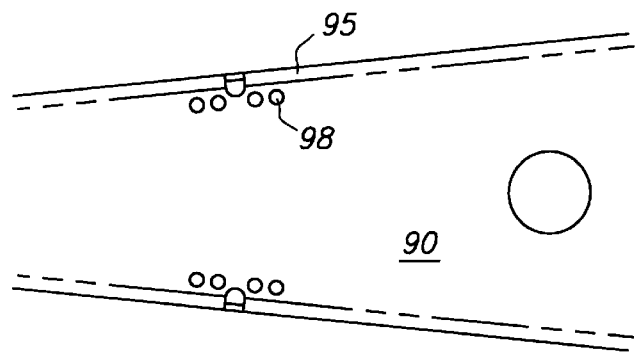
FIG. 9a is a plan view of an alternative embodiment for imparting negative sag curvature to a load beam, showing through holes laterally positioned adjacent the side rails, in accordance with principles of the present invention.
Figure 9B:
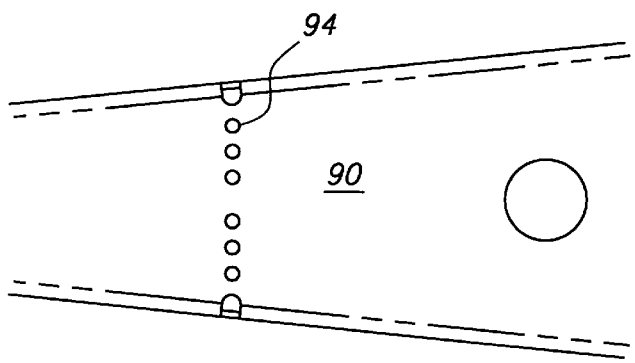
FIG. 9b is a plan view of an alternative embodiment for imparting negative sag curvature to a load beam, showing through holes laterally positioned adjacent the side rails, in accordance with principles of the present invention.

Alternatively, a negative sag curvature in the load beam may be "naturally" imparted to the suspension by designing stress inducing features into predetermined locations of the load beam, which will weaken when the suspension is in a loaded configuration. For example, FIG. 7 provides a cross sectional view along A—A of the up swept rails 68 of the load beam 60 of FIG. 6a, wherein each rail 68 is partially etched at predetermined locations. As a result, the partially etched areas 72a, 72b are effectively weakened, relative to the non-etched areas, so that as the suspension is loaded onto the disk surface, a sag curvature around the weakened area is created. Alternatively, as shown in FIG. 8, a transverse section 86 of load beam 80, at a predetermined location, preferably at approximately the midpoint of the load beam, may be partially etched to similarly weaken the load beam. At that location 86, sag curvature is imparted to the load beam as it is loaded onto the disk. In addition, FIGS. 9a and 9b show another variation of stress inducing features. FIG. 9a shows a plurality of holes 98, either etched or punched, longitudinally adjacent the rails 95. FIG. 9b shows a plurality of holes 94 defined transversely across the width of the load beam 90, approximately about the load beam midpoint In either design, a sag curvature is imparted as a result of the suspension being loaded, providing a lower fist torsional gain. Those skilled in the art will understand that the actual design, e.g. shape, size, configuration of stress inducing features will depend at least upon the actual load beam design and the amount of sag desired.

It should also be understood that in accordance with principles of the present invention, sag curvature in the load beam may be imparted by the combination of both stress inducing features and mechanical forming.

In summary, the instant invention provides a suspension for an actuator in a disk drive that concurrently provides both reduced first torsion gain and reduced first torsion gain sensitivity relative to prior art suspensions. The reduced first torsion gain improves potential head position servo system performance while the decreased gain sensitivity improves manufacturing yields. Thus the present invention facilitates the design and fabrication of cheaper and higher performance disk drives.

Although the present invention has been described in terms of the presently preferred embodiments, it should be understood that the instant disclosure is not to be interpreted as limiting. Various alterations and modifications will no doubt become apparent to those skilled in the art after having read the above disclosure. For example, although the present disclosure is presented in the context of uprail type suspension designs, the teachings are also applicable to downrail designs. Accordingly, it is intended that the appended claims be interpreted as covering all alterations and modifications as fall within the true spirit and scope of the invention.

What is claimed is:

1. A suspension for supporting a read/write head slider adjacent to a disk in a disk drive, the suspension comprising:

a mounting region at an end of the suspension including a base plate;

a spring portion distal to and extending from the mounting region in a first curvature;

an elongated, generally planar reinforced beam section extending from the spring portion, for supporting the read/write head slider at a distal end thereof, such that when the suspension is in a loaded configuration, the reinforced beam section extends from the spring portion in a second curvature; and the reinforced beam section having stiffening side rails along a portion of each lateral edge thereof.

2. The suspension of claim 1, wherein the spring section curves towards the disk.

3. The suspension of claim 1, wherein the spring section curves away from the disk.

4. The suspension of claim 1 further comprising:

an elongated, generally planar flexure having a proximal end and a distal end, the proximal end of the flexure being attached coplanarly to a bottom surface of the reinforced beam section and the distal end of the flexure including the gimbal for pivotably mounting the read/write head slider; and a protrusion defined by a bottom surface of the reinforced beam section, the protrusion interposing and separating a central portion of the flexure from the bottom surface of the reinforced beam section such that the central portion of the flexure extends towards the disk.

\* \* \* \* \*